United States Patent [19]

Murphy et al.

[11] Patent Number: 5,541,767
[45] Date of Patent: Jul. 30, 1996

[54] BIOPTIC TELESCOPE SYSTEM FOR USE WITH BIFOCAL SPECTACLE

[75] Inventors: Peter J. Murphy, Pt. Washington; Richard E. Feinbloom, New York, both of N.Y.

[73] Assignee: Designs for Vision, Inc., Ronkonkoma, N.Y.

[21] Appl. No.: 330,266

[22] Filed: Oct. 27, 1994

[51] Int. Cl.⁶ ............................ G02B 23/00; G02C 1/00
[52] U.S. Cl. .................. 359/399; 359/409; 359/412; 359/420; 351/41; 351/45; 351/158; 351/160 R
[58] Field of Search .............................. 359/399, 409, 359/481, 421, 672, 420, 412; 351/158, 41, 45, 46, 61, 58, 160 R, 160 H

[56] References Cited

U.S. PATENT DOCUMENTS

| D. 296,337 | 6/1988 | Caplan | 261/75 |
| 4,834,525 | 5/1989 | Vansaghi | 351/158 |
| 4,865,438 | 9/1989 | Wada | 351/158 |
| 4,929,075 | 5/1990 | Eliakim | 359/480 |
| 5,428,474 | 6/1995 | Murphy | 359/409 |

Primary Examiner—Thong Nguyen
Assistant Examiner—Mohammad Sikder
Attorney, Agent, or Firm—Plevy & Associate

[57] ABSTRACT

A method and apparatus for allowing a user who wears spectacles including at least one lens having a positive magnification factor, to view a distant object through both the lens of the spectacles and a telescope. The method comprises the step of positioning a lens in the optical path of the telescope. The lens placed in the optical path of the telescope is adapted to cancel the positive magnification factor of the lens of the spectacles to maintain the afocal characteristic of telescope. The apparatus comprises at least one afocal telescope defining an optical path having a first lens oriented in the optical path for magnifying a distant object to be viewed through the afocal telescope system. The telescope further comprises a second lens oriented in the optical path for cancelling the positive magnification factor of the lens to maintain the afocal characteristic of the telescope.

20 Claims, 3 Drawing Sheets

5,541,767

BIOPTIC TELESCOPE SYSTEM FOR USE WITH BIFOCAL SPECTACLE

FIELD OF INVENTION

This invention relates generally to visual aids and more particularly to, to a telescope system which has been adapted for use with bifocal spectacles.

BACKGROUND OF THE INVENTION

Presbyopia is a visual condition in which the lens of the eye loses some elasticity. When this condition occurs it causes defective accommodation and inability of the eye to focus sharply for near vision such as is required for reading. This condition is more commonly known as farsightedness. Presbyopia typically manifests itself as a person enters middle age.

Thus, persons who suffer from presbyopia are accommodated by aids such as spectacles, which employ relative distance magnification which enable these people to view an object which is close to them. Such aids essentially operate by bringing the object to be viewed closer to their eyes to create an enlarged retinal image.

Spectacles which accomplish relative distance magnification are commonly referred to as bifocal spectacles. Such devices are very well known in the art and include a bifocal lens arrangement. As is well known in the art, a major portion of a bifocal lens includes the person's normal prescription which optimizes the person's far or distant visual acuity. In the lower portion of the bifocal lens is a "bifocal" segment which provides a positive magnification for enabling the person to maintain a clear focus at a near working or reading distance.

Many people who use bifocal spectacles are employed in occupations which involve precision work performed at an arms length distance. Examples of such occupations include surgeons, dentists, and machinists.

In the performance of such work it is often desirable to magnify the work area. The prior art has responded to this need by providing spectacles with a pair of telescopes. In the prior art arrangement shown in FIG. 1, each telescope 26 and 28 is attached directly to its respective carrier lens 14 and 16 of the spectacles 10. The arrangement shown in FIG. I is essentially of the type sold by Designs for Vision, Inc., the assignee herein, under the name BIOPTIC TELESCOPES.

In the prior art arrangement shown in FIG. 1, each bioptic telescope 26 and 28, also known as a Galilean telescope, is received by a hole drilled in its associated carrier lens. The telescopes are generally oriented in the carrier lens such that the optic center of the ocular lens of the telescope is Just below the top of the carrier lens. The holes drilled in the carrier lens are drilled at a slightly upward angle from the horizontal plane. Such an arrangement positions the telescopes out of the user's line of vision. Since the upper segments 18 and 20 and respective bifocal segments 22 and 24 of the lenses 14 and 16 are generally configured for the user's normal and reading prescriptions respectively, the user is capable of using the spectacles 10 conventionally for general work or reading. When the user needs magnification for distance spotting via the telescopes, the user must drop or tilt his head to bring the telescopes into alignment with his eyes and the work area or object to be viewed. When the user wants to view through either the upper or bifocal segments of the lens again, the user must then raise or tilt his head back to bring the lens into alignment with his eyes again for normal viewing. The degree of head tilting needed when switching between the telescopes and the bifocal segment of the lens is much more pronounced than is required to shift between the upper segment of the lens and the telescopes. Consequently, the user must make a very deliberate change in the position of his head in order to accomplish the switch.

This continuous dropping and raising of the user's head to view through either the telescopes or the carrier lens of prior art designs is physically tiring and cumbersome. This is especially true for example, during surgical procedures where the surgeon must look down at the work area at one moment and then look up at life support monitors and/or nurses at another moment.

Further, since the arms-length work area is typically located at waist level, the user must tilt his or her head downwardly at an angle in order to view the work area. When using the earlier described prior art telescopes, the upper location of the telescopes in the lens requires the user to tilt his or her head at an even greater angle which is unnatural and uncomfortable. This unnatural posture can eventually lead to the user acquiring neck and back problems.

The above-described arrangement further requires that the spectacles be dedicated exclusively for use with the telescopes, since the lenses are drilled to receive the telescopes. Thus, when the user wishes not to have the benefits or the cosmetic look of the telescope arrangement, the user must also have a second pair of conventional spectacles.

Other prior art arrangements are known to exist whereby the telescopes are not attached directly to the carrier lenses. An example of such an arrangement is disclosed in U.S. Pat. No. 296,337 issued to Caplan on Jun. 21, 1988. In the arrangement disclose therein, the telescopes are pivotally attached to the spectacle frame. When the user wishes to view an object through the telescopes, the user pivots the telescopes down in front of the lenses. When the user wishes to view conventionally through the spectacles, the telescopes are pivoted up and away from the lenses.

The inventors herein have studied the advantages and the disadvantages of the prior art designs and have determined that it would be desirable to have detachable telescopes which are not mounted directly to the lens. Such a configuration would allow the spectacles to be used without the telescopes if desired. The inventors have further determined that it would be desirable to orient the telescopes in front of the lower portion of the lenses or in front of the bifocal magnifying lenses. Orienting the telescopes in front of this area of the lenses eliminates the need for the user to tilt his head downward in order to view the waist level work area, thus providing a more natural head tilt angle. Moreover, the orientation of the telescopes in this position allows the user to view a monitor or talk with an assistant, by merely looking up from the work area without having to move or tilt his head.

Merely orienting the telescopes in front of the lower portion of the lenses, however, presents a particular problem when the spectacles are bifocal. The telescopes used in prior art arrangements are afocal in nature. A telescope which is afocal in nature is generally one that allows a person to view an object through the telescope without having to focus the telescope. When an afocal telescope is Viewed through the bifocal segment of a bifocal lens, the afocal nature of the telescope is cancelled via the bifocal segment.

Thus, it is a primary object of the present invention to provide a detachable afocal telescope arrangement for bifocal spectacles which can be viewed through the bifocal segment of the spectacles without losing the telescope arrangement's afocal characteristics.

SUMMARY OF THE INVENTION

A method for allowing a user who wears spectacles including at least one lens having a positive magnification factor, to view a distant object through both the lens of the spectacles and a telescope. The method comprises the step of positioning a cancelling lens in the optical path of the telescope. The cancelling lens placed in the optical path of the telescope is adapted to cancel the positive magnification factor of the lens of the spectacles to maintain the afocal characteristic of telescope.

The present invention also discloses an afocal telescope system for use with a pair of spectacles having at least one lens having a positive magnification factor. The system comprises at least one afocal telescope defining an optical path having a first lens oriented in the optical path for magnifying a distant object to be viewed through said afocal telescope system. The system further comprises a second lens oriented in the optical path for cancelling the positive magnification factor of the lens to maintain the afocal characteristic of the telescope system.

BRIEF DESCRIPTION OF THE DRAWINGS

The present invention will be better understood upon the reading the foregoing Detailed Description in conjunction with the drawings wherein.

DETAILED DESCRIPTION OF THE INVENTION

The present invention is directed at an afocal telescope assembly having telescopes which are adapted for use in conjunction with the bifocal segments of a user's prescription.

Figure 1:
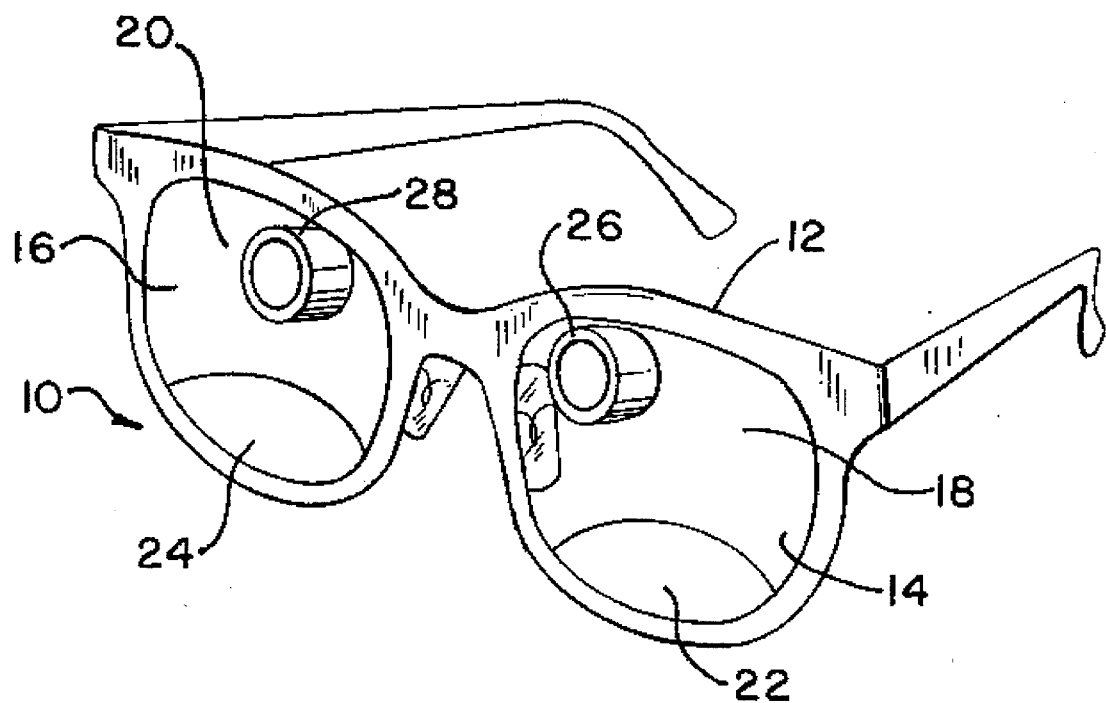
FIG. 1 is a perspective view of a prior art bioptic telescope system.
Figure 2:
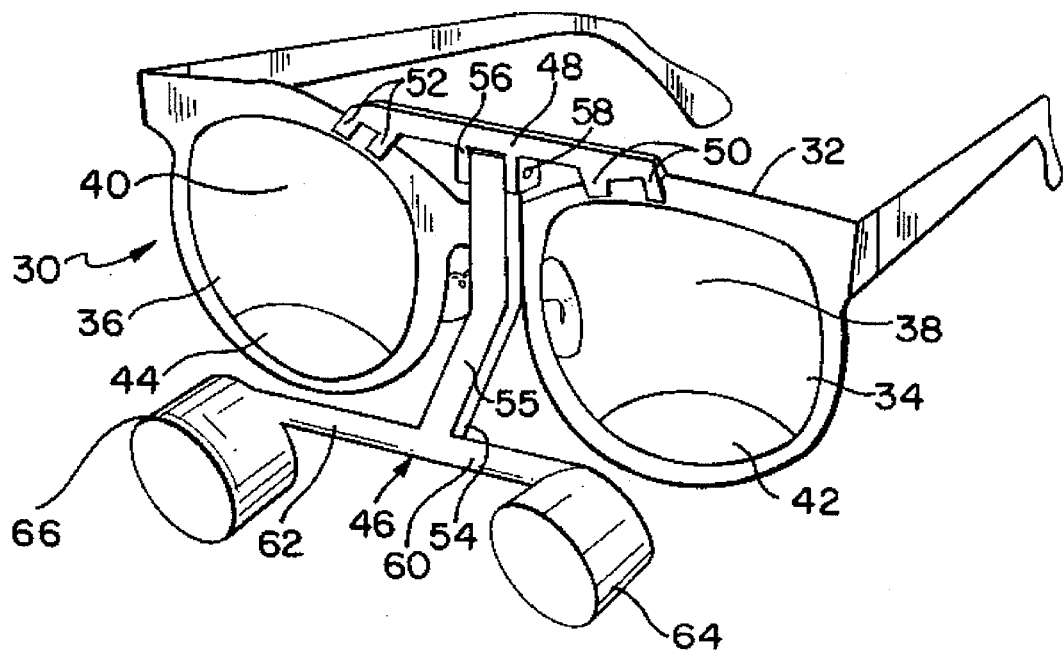
FIG. 2 is a perspective view of a bioptic telescope system according to a preferred exemplary embodiment of the present invention.

Referring now to FIG. 2, there is shown an exemplary embodiment of the telescopic system according to the present invention designated by the numeral 30. The telescopic system 30 comprises a conventional spectacles frame 32, as is commonly used by persons needing prescription eyeglasses. The spectacles frame 32 receives a pair of bifocal lenses 34 and 36 which are indicative of a lens for the left eye and a lens for the right eye respectively. The bifocal lenses 34 and 36 are preferably constructed from glass or plastic, these materials being commonly used in making lenses for spectacles.

The bifocal lenses 34 and 36 each have respective upper segments 38 and 40 and respective bifocal segments 42 and 44. The upper segments 38 and 40 are generally configured for the user's normal prescription. The bifocal segments 42 and 44 are high plus lenses which enable the user to maintain a clear focus at the arm's length working distance.

A pivoting telescope assembly 46 is removably attached to the upper portion of the spectacles frame 32. The pivoting telescope assembly is preferably made from plastic or any other suitable material. The pivoting telescope assembly comprises a horizontally extending attaching bracket 48 which defines clips 50 and 52 at opposite ends of the attaching bracket 48. The clips 50 and 52 detachably mount the pivoting telescope assembly 46 to the spectacles frame 32.

A centrally located hinge member 56 is defined on the lower portion of the attaching bracket 48 for receiving a T-shaped telescope support member 54. The support member 54 defines an outwardly projecting body 55 and a pair of arms 60 and 62 which extend laterally in opposite directions at one end of the body 55. The other end of the body 55 is pivotally attached to the hinge member 56 by a pivot pin 58. The arms 60 and 62 each carry a bioptic telescope 64 and 66 respectively. As earlier mentioned, bioptic telescopes are also known as Galilean telescopes.

Figure 3:
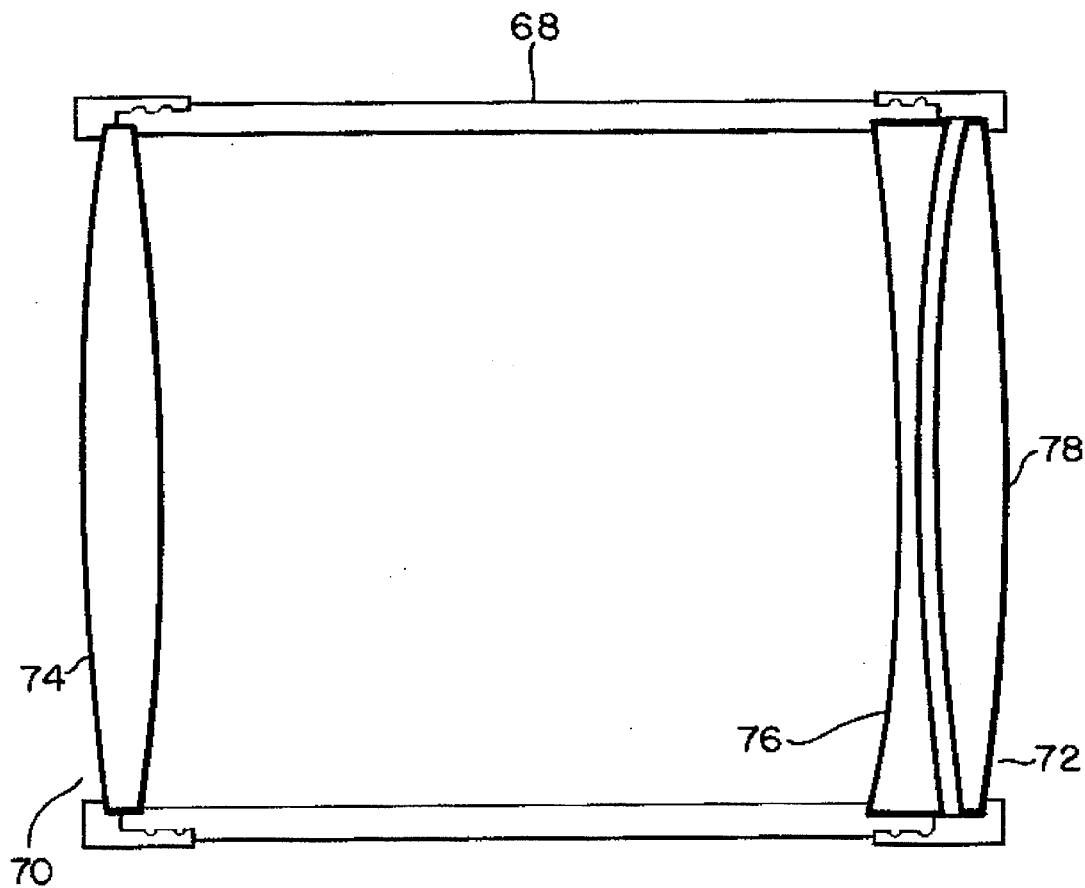
FIG. 3 is a cross-sectional view through a telescope of the present invention.

Referring now to FIG. 3, there is shown a cross-sectional view of one the bioptic or Galilean telescopes 64 and 66. Each telescope comprises a generally cylindrical housing 68 having a first open end 70 and a second open end 72. An objective lens 74 is positioned within housing 68 adjacent the first open end 70. A divergent ocular lens 76 is located within housing 68 adjacent the second open end 72. As is well known, Galilean telescopes employ divergent ocular lenses to produce an uprightimage.

The objective lens 74 and the ocular lens 76 cooperate to provide "magnification" of distant objects viewed through the telescope. As is well known, however, telescopes actually increase the visual angle of what is being observed since, size or the distance of objects are Judged by the angle under which they are seen. When an object is observed through a telescope, the light rays coming from the distant object are generally parallel. The light rays then converge as they pass through the objective lens to form an image at the focus of the objective lens. This point of focus coincides with the point of focus of the ocular lens so that the rays emerging from the ocular lens are again parallel. Thus, the observer sees the object as though it were at infinity, but under a larger angle than without the aid of the telescope. The magnification provided by any given telescope is defined as the ratio of the focal length of the objective lens to that of the ocular lens. Accordingly, various powers of magnification are possible.

As earlier mentioned, prior art telescopes are afocal wherein the objective and ocular lenses have been designed such that no focusing of the telescope is required when viewing objects at various distances. The afocal characteristics of the telescopes of the present invention are maintained when an object is viewed through both the bifocal segments of the spectacles and the telescopes. This is accomplished in the present invention by providing each telescope with a high negative lens 78 which operates to cancel the high plus of the bifocal segments. The high negative of lens 78 is generally of a value equal to that of the high plus used in the bifocal segments of the spectacles. Thus, the telescopes of the present invention are individually tailored for the user's bifocal prescription.

Still referring to FIG. 3, the high negative lens 78 is positioned within the housing 68 such that it is immediately in front of the ocular lens 76 and adjacent to the second open end 72 of the housing 68. It should be understood, however, that the position of the high negative lens 78 is not limited to the location shown in FIG. 3. The high negative lens 78 can be positioned for instance, between the objective lens 74 and the ocular lens 76. One of ordinary skill in the art will recognize that the exact location selected for the high negative lens is dependent upon many considerations including the power of magnification desired and the particular high negative lens required.

The pivoting telescope assembly 46 of the present invention doubles the utility of the spectacles because the pivoting telescope assembly can be removed entirely from the spectacle frame 32 by merely unsnapping the clips 50 and 52 of the attaching bracket 48 from the spectacle frame 32. This configuration provides the user with spectacles that can be used in a conventional manner. When the user requires the magnification benefits of the telescopes, the user simply snaps the clips 50 and 52 of the attaching bracket 48 onto the spectacle frame 32. The hinge 56 allows the telescopes 64 and 66 to be flipped up and out of the way of the lenses 34 and 36 when the telescopes are not immediately required. Although the embodiment shown in FIG. 2 does not include means for locking the telescopes in the up position, such means for locking are well known in the art and can be provided if desired. For instance, the hinge can be provided with a detent mechanism (not shown) to hold the telescopes securely in the full up position.

Further, the arms 60 and 62 of the T-shaped telescope support member 54 can be provided with means for allowing the spacing between the telescopes 64 and 66 to be adjusted to match the interpupillary distance of the user, i.e., the spacing between the eyes of the user. Such means can take the form of an elongated slot or other suitable arrangement (not shown).

The projecting body 55 of the T-shaped telescope support member 54 is shown in FIG. 2 as a bent member which functions to hold the telescopes 64 and 66 out in front of respective bifocal segments 42 and 44. It should be understood, however, that the T-shaped member along with the other members of the pivoting telescope assembly 46 can have any configuration which is suitable for holding the telescopes out in front of their respective bifocal segments.

It should be understood that the embodiment described herein is merely exemplary and that a person skilled in the art may make many variations and modifications utilizing functionally equivalent elements to those described herein. Any and all such variations or modifications as well as others which may become apparent to those skilled in the art, are intended to be included within the scope of the invention as defined by the appended claims.

We claim:

1. A method for allowing a user who suffers from presbyopia and who wears spectacles including at least one bifocal lens having a bifocal segment with a positive magnification factor which corrects said user's presbyopia, to view a distant object through both said bifocal segment of said at least one bifocal lens of said spectacles and a first telescope oriented in a first position immediately adjacent to said bifocal segment of said at least one bifocal lens, said first telescope being afocal and defining an optical path, said method comprising the steps of:

positioning lens means in said optical path of said first telescope, said lens means being adapted to cancel said positive magnification factor of said bifocal segment of said at least one bifocal lens to maintain the afocal characteristic of said first telescope.

2. The method according to claim 1, wherein said first telescope comprises a Galilean telescope.

3. The method according to claim 1, wherein said at least one bifocal lens comprises a pair of first and second bifocal lenses, said first telescope being associated with said first bifocal lens.

4. The method according to claim 3, further comprising a second telescope and being associated with said second bifocal lens.

5. The method according to claim 4, wherein said first and second telescopes are pivotally mounted to said spectacles.

6. The method according to claim 5, wherein said first and second telescopes can be pivoted from said first position into a second position wherein said first and second telescopes are oriented away from said respective first and second bifocal lenses when said user wishes to view said object only through said first and second bifocal lenses.

7. The method according to claim 1, further comprising the step of orienting said first telescope away from said at least one bifocal lens when said user wishes to view said object only through said at least one bifocal lens.

8. The method according to claim 1, wherein said lens means comprises a lens having a negative magnification factor which cancels said positive magnification of said bifocal segment of said at least one bifocal lens.

9. A method for allowing a user who suffers from presbyopia to view a distant object through spectacles having at least one bifocal lens having a bifocal segment with a positive magnification factor which operates to correct the user's presbyopia, said method comprising the steps of:

providing at least one afocal telescope for magnifying said distant object, said at least one telescope having lens means for cancelling said magnification factor of said bifocal segment of said at least one bifocal lens; and positioning said at least one afocal telescope in a first position immediately adjacent to said bifocal segment of said at least one bifocal lens to maintain the afocal characteristic of said at least one telescope.

10. The method according to claim 9, wherein said step of positioning further includes positioning said at least one afocal telescope in a second position away from said at least one bifocal lens so that said user can view said object through said bifocal segment of said at least one bifocal lens.

11. The method according to claim 10, wherein said at least one bifocal lens comprises a pair of first and second bifocal lenses and said at least one afocal telescope comprises first and second afocal telescopes, said first afocal telescope being associated with said first bifocal lens and said second afocal telescope being associated with said second bifocal lens.

12. The method according to claim 11, wherein said first and second afocal telescopes each comprises a Galilean telescope.

13. The method according to claim 11, wherein said first and second afocal telescopes are pivotally mounted to said spectacles.

14. The method according to claim 9, wherein said lens means comprises a lens having a negative magnification factor which cancels said positive magnification of said bifocal segment of said at least one bifocal lens.

15. An afocal telescope system for use with a pair of spectacles having at least one bifocal lens having a bifocal segment with a positive magnification factor which operates to correct a user's presbyopia, comprising;

at least one afocal telescope defining an optical path;

first lens means oriented in said optical path for magnifying a distant object to be viewed through said afocal telescope system; and second lens means oriented in said optical path for cancelling said positive magnification factor of said bifocal segment of said at least one bifocal lens for maintaining an afocal characteristic of said afocal telescope system.

16. The afocal telescope system according to claim 15, wherein said second lens means comprises a lens having a negative magnification factor which cancels said positive magnification factor of said bifocal segment of said at least one bifocal lens.

17. The afocal telescope system according to claim 16, further comprising means for attaching said telescope system to the spectacle, said means including pivoting means for allowing said at least one telescope to be oriented in a first position immediately adjacent to a side of the at least one bifocal lens which is opposite to the user's eye, to maintain said afocal characteristic of said telescope system.

18. The afocal telescope system according to claim 15, wherein said second lens means comprises a lens having a negative magnification factor which cancels said positive magnification of said bifocal segment of said at least one bifocal lens.

19. The afocal telescope system according to claim 15, wherein said at least one telescope comprises first and second Galilean telescopes.

20. The afocal telescope system according to claim 15, in combination with said pair of spectacles.

* * * * *